United States Patent

[11] 3,621,007

| [72] | Inventors | Erwin Hahn<br>Viernheim;<br>Hans Guenter Wippel, Ludwigshafen, both of Germany |
| --- | --- | --- |
| [21] | Appl. No. | 859,204 |
| [22] | Filed | Sept. 18, 1969 |
| [45] | Patented | Nov. 16, 1971 |
| [73] | Assignee | Badische Anilin- & Soda-Fabrik Aktiengesellschaft<br>Ludwigshafen am Rhine, Germany |
| [32] | Priority | Sept. 21, 1968 |
| [33] | | Germany |
| [31] | | P 17 94 201.7 |

[54] WATER-INSOLUBLE THIADIAZOLE CONTAINING MONOAZO DYES
2 Claims, No Drawings

[52] U.S. Cl. .................................................. 260/158,
260/306.8, 260/471, 8/178, 8/179
[51] Int. Cl. ......................................................C09b 29/08,
D06p 1/02
[50] Field of Search .............................................. 260/158

[56] References Cited
UNITED STATES PATENTS
3,441,554   4/1969   Hahn et al. ................... 260/158

Primary Examiner—Charles B. Parker
Assistant Examiner—Donald M. Papuga
Attorney—Johnston, Root, O'Keeffe, Keil, Thompson & Shurtleff ABSTRACT: N,N-substituted para-aminomonoazo dyes having a 3-($\beta$-carbalkoxyethyl)-mercapto-5-aminothiadiazole-(1,2,4) as diazo component. They are useful for dyeing cellulose esters or synthetic linear polyesters.

WATER-INSOLUBLE THIADIAZOLE CONTAINING MONOAZO DYES

The invention relates to water-insoluble monoazo dyes having the general formula (I):

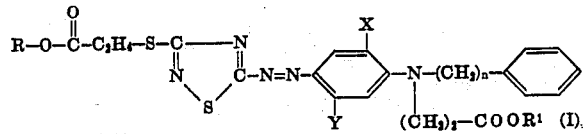

in which R and $R^1$ denote alkyl radicals having one to four carbon atoms, X denotes a hydrogen atom or a methoxy or ethoxy group, Y denotes a hydrogen, chlorine or bromine atom or a methyl, ethyl, methoxy, ethoxy, acetylamino or propionylamino group and $n$ denotes one of the integers 1 and 2.

Examples of the radicals R and $R^1$ are methyl, ethyl, n-propyl, isopropyl, n-butyl, isobutyl or tertiary-butyl.

Dyes having the general formula:

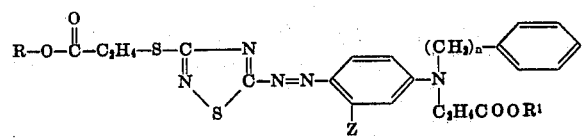

in which Z denotes a hydrogen or chlorine atom or a methyl group, and R, $R^1$ and $n$ have the meanings given above are of special industrial importance.

The new dyes are eminently suitable, particularly in finely divided form, for dyeing textile material of acetylcellulose, such as secondary acetate or triacetate, polyamides, such as nylon-6 or nylon-6,6, and particularly linear polyesters such as polyethylene glycol terephthalate.

The dyeings obtained have good wet-fastness, good light-fastness and very good thermal resistance. The very good levelling property of the new dyes should also be emphasized.

The carrier method and preferably the high-temperature method and the thermosol method are suitable dyeing methods.

Dyes having the formula (I) may be obtained for example by reaction of a diazo compound of an amine having the general formula (II):

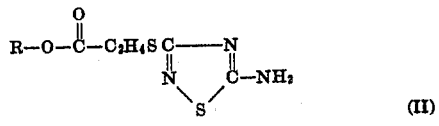

with a coupling component having the general formula (III):

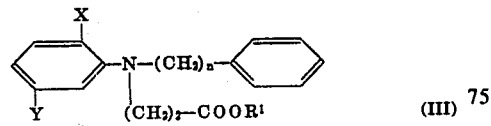

in which R, X, Y and $n$ have the meanings given above.

Examples of compounds having the formula (II) are:
3-($\beta$-carbomethoxyethyl)-mercapto-5-aminothiadiazole-(1,2,4),
3-($\beta$-carboethoxyethyl)-mercapto-5-aminothiadiazole-(1,2,4),
3-($\beta$-carbo-n-butoxyethyl)-mercapto-5-aminothiadiazole-(1,2,4),
3-($\beta$-carboisopropoxylethyl)-mercapto-5-aminothiadiazole-(1,2,4).

Examples of compounds having the formula (III) are:
N-benzyl-N-$\beta$-carbomethoxyethylaniline,
N-benzyl-N-carboethoxyethylaniline,
N-$\beta$-phenylethyl-N-$\beta$-carboethoxyethylaniline,
N-$\beta$-phenylethyl-N-$\beta$carbomethoxyethyl-m-toluidine,
N-$\beta$-phenylethyl-N-$\beta$-carboethoxyethyl-m-chloroaniline,
N-benzyl-N-$\beta$-carbomethoxyethyl-m-acetylaminoaniline,
N-benzyl-N-$\beta$-carboethoxyethyl-3-acetylamino-6-methoxyaniline,
N-benzyl-N-$\beta$-carbobutoxyethyl-m-toluidine,
N-benzyl-N-$\beta$-carbomethoxyethyl-m-chloroaniline and
N-benzyl-N-$\beta$-carbopropoxyethylaniline.

The invention is illustrated by the following examples. The parts and percentages given in the following examples are by weight.

EXAMPLE 1

11.9 parts of 3-$\beta$-carbomethoxyethylmercapto-5-aminothiadiazole is dissolved at room temperature in 30 parts of concentrated sulfuric acid. One hundred parts of a mixture in the ratio 17:3 of acetic acid and propionic acid is allowed to flow gradually into this solution at 0° to 5° C. Then at the same temperature 15 parts of nitrosylsulfuric acid having a content of 12.8 percent of free 57 trioxide is added. The whole is stirred for 3 hours at 0° to 5° C. and the clear diazo solution obtained is allowed to flow into a solution of 14.15 parts of N-benzyl-N-$\beta$-carboethoxyethylaniline in 250 parts of acetone, 10 parts of concentrated hydrochloride acid and 75 parts of ice. Thirty minutes later the resulting mixture is diluted by adding 1,000 parts of ice.

The dye which separates in crystalline form is suction filtered after stirring has been continued for 10 hours, washed with water until neutral and dried at 50° C. at subatmospheric pressure. It dyes polyethylene glycol terephthalate bright red shades having very good light-fastness and thermal resistance.

Dyes having similarly good properties are obtained by using (instead of 3-$\beta$-carbomethoxyethylmercapto-5-aminothiazole) 3-$\beta$-carboethoxy-(or -propoxy-or -butoxy-)-ethylmercapto5aminothiadiazole and following the procedure of example 1.

When the coupling components specified in the following table are used instead of the coupling component (N-benzyl-N-$\beta$-carboethoxyethylaniline) specified in example 1 and the procedure described in example 1, is followed in other respects, dyes having similarly good properties are obtained.

| Example No. | Coupling component | Shade of dyeing on polyester |
|---|---|---|
| 2 | ![phenyl-N(C₂H₄-C₆H₅)(C₂H₄COOCH₃)] | Red. |
| 3 | ![m-methyl-phenyl-N(C₂H₄-C₆H₅)(C₂H₄COOC₂H₅)] | Dark red. |
| 4 | ![m-chloro-phenyl-N(C₂H₄-C₆H₅)(C₂H₄COOCH₃)] | Scarlet. |

| Example No. | Coupling component | Shade of dyeing on polyester |
|---|---|---|
| 5 | 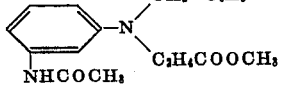 | Ruby. |
| 6 | 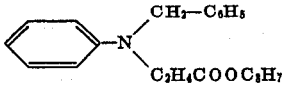 | Red. |
| 7 | 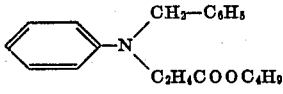 | Red. |
| 8 | 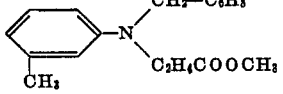 | Dark red. |
| 9 | 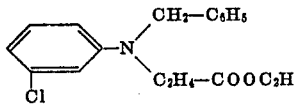 | Scarlet. |
| 10 | 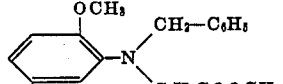 | Violet. |
| 11 | 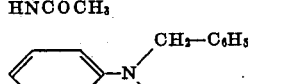 | Red. |
| 12 | 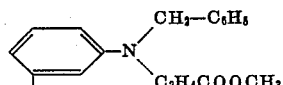 | Ruby. |
| 13 | 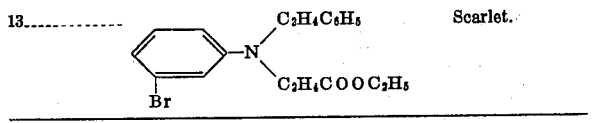 | Scarlet. |

We claim:

1. A water-insoluble monoazo dye having the formula:

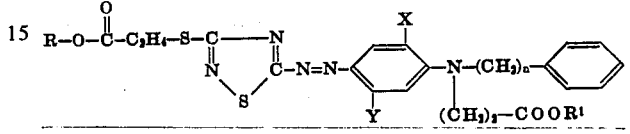

in which R and $R^1$ denote alkyl of one to four carbon atoms, X denotes hydrogen, methoxy, ethoxy, Y denotes hydrogen, chlorine or bromine, or methyl, ethyl, methoxy, ethoxy, acetylamino or propionylamino and n denotes one of the integers 1 and 2.

2. A dye having the formula:

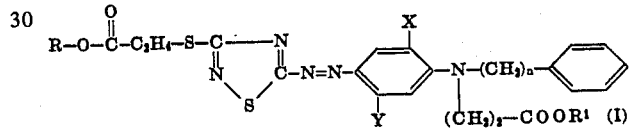

in which Z denotes hydrogen, chlorine, or methyl and R, $R^1$ and n have the meanings given in claim 1.

* * * * *

PO-1050
(5/69)

UNITED STATES PATENT OFFICE
CERTIFICATE OF CORRECTION

Patent No. 3,621,007      Dated November 16, 1971

Inventor(s) Erwin Hahn and Hans Guenter Wippel

It is certified that error appears in the above-identified patent and that said Letters Patent are hereby corrected as shown below:

Column 2, line 35, "57" should read -- dinitrogen --.

Column 4, in claim 2, the formula reading

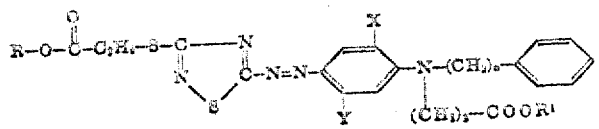

should read --

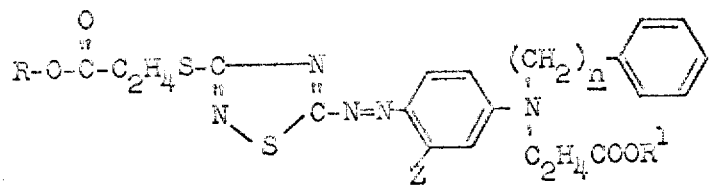

--.

Signed and sealed this 23rd day of May 1972.

(SEAL)
Attest:

EDWARD M. FLETCHER, JR.
Attesting Officer

ROBERT GOTTSCHALK
Commissioner of Patents